United States Patent
Yokoe (10) Patent No.: US 12,463,205 B2
(45) Date of Patent: Nov. 4, 2025

(54) POSITIVE ELECTRODE ACTIVE MATERIAL AND NON-AQUEOUS ELECTROLYTE SECONDARY BATTERY USING THE POSITIVE ELECTRODE ACTIVE MATERIAL

(71) Applicant: Prime Planet Energy & Solutions, Inc., Tokyo (JP)

(72) Inventor: Kenji Yokoe, Okazaki (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 860 days.

(21) Appl. No.: 17/670,495

(22) Filed: Feb. 13, 2022

(65) Prior Publication Data
US 2022/0263077 A1 Aug. 18, 2022

(30) Foreign Application Priority Data
Feb. 15, 2021 (JP) .................. 2021-021538

(51) Int. Cl.
| | |
|---|---|
| *H01M 4/525* | (2010.01) |
| *H01M 4/36* | (2006.01) |
| *H01M 4/48* | (2010.01) |
| *H01M 4/505* | (2010.01) |
| *H01M 10/0525* | (2010.01) |
| *H01M 4/02* | (2006.01) |

(52) U.S. Cl.
CPC ........... *H01M 4/366* (2013.01); *H01M 4/483* (2013.01); *H01M 10/0525* (2013.01); *H01M 2004/028* (2013.01)

(58) Field of Classification Search
CPC .. H01M 4/366; H01M 4/483; H01M 10/0525; H01M 2004/028
See application file for complete search history.

(56) References Cited

U.S. PATENT DOCUMENTS

| | | |
|---|---|---|
| 2009/0197181 A1 | 8/2009 | Sakitani et al. |
| 2010/0178560 A1* | 7/2010 | Kim .......... H01B 1/08 |
| | | 252/514 |

(Continued)

FOREIGN PATENT DOCUMENTS

| | | |
|---|---|---|
| CN | 1588679 A | 3/2005 |
| CN | 104600290 A | 5/2015 |

(Continued)

OTHER PUBLICATIONS

Ramirez, Mesoporous characteristics of crystalline indium-titania synthesized by the sol-gel route (Year: 2010).*

(Continued)

*Primary Examiner* — Yoshitoshi Takeuchi
(74) *Attorney, Agent, or Firm* — HAUPTMAN HAM, LLP (57) ABSTRACT

There is provided a positive electrode active material capable of giving excellent output characteristics to a non-aqueous electrolyte secondary battery and suppressing an increase in resistance after cyclic charge and discharge. The positive electrode active material disclosed herein includes a core portion which contains a lithium transition metal composite oxide, and a coat portion with which at least part of a surface of the core portion is coated. The coat portion contains brookite-type $TiO_2$ and rutile-type $TiO_2$.

2 Claims, 3 Drawing Sheets

(56) References Cited

U.S. PATENT DOCUMENTS

| | | | |
|---|---|---|---|
| 2012/0156565 A1* | 6/2012 | Kim | H01M 4/366 |
| | | | 429/231.95 |
| 2014/0272596 A1 | 9/2014 | Yamamoto et al. | |
| 2015/0255788 A1 | 9/2015 | Yokouchi et al. | |
| 2017/0222223 A1* | 8/2017 | Hong | H01M 4/62 |
| 2018/0083279 A1 | 3/2018 | Takami et al. | |
| 2018/0248179 A1* | 8/2018 | Wang | C01G 53/50 |
| 2018/0277839 A1 | 9/2018 | Luo et al. | |
| 2018/0346337 A1 | 12/2018 | Tour et al. | |
| 2019/0280284 A1 | 9/2019 | Azami | |
| 2020/0153034 A1 | 5/2020 | Kawai | |
| 2020/0343541 A1 | 10/2020 | Yoo et al. | |
| 2020/0388834 A1* | 12/2020 | Horikawa | H01M 4/483 |
| 2022/0052338 A1 | 2/2022 | Li et al. | |

FOREIGN PATENT DOCUMENTS

| | | |
|---|---|---|
| CN | 104662713 A | 5/2015 |
| CN | 107017385 A | 8/2017 |
| CN | 107275619 A | 10/2017 |
| CN | 108172804 A | 6/2018 |
| CN | 108899550 A | 11/2018 |
| JP | 2004103566 A | 4/2004 |
| JP | 2007-005267 A | 1/2007 |
| JP | 200853207 A | 3/2008 |
| JP | 20129270 A | 1/2012 |
| JP | 2014-177722 A | 9/2014 |
| JP | 2015-053165 A | 3/2015 |
| JP | 2015-088297 A | 5/2015 |
| JP | 201599646 A | 5/2015 |
| JP | 2015204256 A | 11/2015 |
| JP | 2017152294 A | 8/2017 |
| JP | 2018-190720 A | 11/2018 |
| JP | 2018-533174 A | 11/2018 |
| KR | 10-2018-0064196 A | 6/2018 |
| KR | 10-2020-086111 A | 7/2020 |
| WO | 2018051667 A1 | 3/2018 |
| WO | 2019/168035 A1 | 9/2019 |

OTHER PUBLICATIONS

Office Action, U.S. Appl. No. 17/579,598, mailed Aug. 15, 2024, 10pp.

Office Action, U.S. Appl. No. 17/579,598, mailed Dec. 16, 2024, 11pp.

Office Action, U.S. Appl. No. 17/579,598, mailed May 31, 2024, 26pp.

Final Office Action in U.S. Appl. No. 17/579,598 mailed May 2, 2025, 11pp.

Office Action in U.S. Appl. No. 17/579,598, mailed Aug. 11, 2025, 10pp.

\* cited by examiner

POSITIVE ELECTRODE ACTIVE MATERIAL AND NON-AQUEOUS ELECTROLYTE SECONDARY BATTERY USING THE POSITIVE ELECTRODE ACTIVE MATERIAL

CROSS REFERENCE TO RELATED APPLICATIONS

The present application claims priority based on Japanese Patent Application No. 2021-021538 filed on Feb. 15, 2021, the entire contents of which are incorporated herein by reference in its entirety.

BACKGROUND

The present disclosure relates to a positive electrode active material. The present disclosure also relates to a non-aqueous electrolyte secondary battery using the positive electrode active material.

A non-aqueous electrolyte secondary battery such as a lithium-ion secondary battery is suitably used in a portable power source of a personal computer or a mobile terminal, or in a power source for driving a vehicle such as a battery electric vehicle (BEV), a hybrid electric vehicle (HEV), or a plug-in hybrid electric vehicle (PHEV). Such a non-aqueous electrolyte secondary battery typically includes a positive electrode, a negative electrode, and a non-aqueous electrolyte. In general, such a positive electrode contains a positive electrode active material capable of occluding and releasing an ion serving as a charge carrier.

In the non-aqueous electrolyte secondary battery, in general, the positive electrode active material capable of occluding and releasing the ion serving as the charge carrier is used. For the purpose of improving characteristics of the non-aqueous electrolyte secondary battery, a coating is provided in the positive electrode active material.

For example, Japanese Patent Application Publication No. 2015-099646 discloses that, by coating a positive electrode active material having an Li-excessive composition with $TiO_2$ (especially anatase-type $TiO_2$) having a ratio of an X-ray diffraction peak belonging to the anatase type (101) to an X-ray diffraction peak belonging to the rutile type (110) of 2.1, high-rate discharge performance and output characteristics of a lithium-ion secondary battery are improved.

SUMMARY

However, as a result of elaborate study of the present inventors, it has been found that, in the positive electrode active material coated with $TiO_2$ of the conventional art, there is room for improvement in a reduction in reaction resistance, and there is room for improvement in output characteristics in a non-aqueous electrolyte secondary battery which uses the above positive electrode active material. In addition, it has been found that there is room for improvement also in the effect of suppressing an increase in resistance after a charge-discharge cycle is repeated.

The present disclosure has been made in view of such circumstances, and a main object thereof is to provide a positive electrode active material capable of giving excellent output characteristics to a non-aqueous electrolyte secondary battery and suppressing an increase in resistance after cyclic charge and discharge.

In order to attain the above object, the present disclosure provides a positive electrode active material including a core portion which contains a lithium transition metal composite oxide, and a coat portion with which at least part of a surface of the core portion is coated. The coat portion contains brookite-type $TiO_2$ and rutile-type $TiO_2$.

The present inventors have found that, according to the positive electrode active material in which the coat portion containing brookite-type $TiO_2$ and rutile-type $TiO_2$ is provided on the core portion, output characteristics and cycle characteristics of the non-aqueous electrolyte secondary battery which uses the positive electrode active material are improved, and have completed the present disclosure. Although not intended to be specifically interpreted in a limited way, it can be considered that the coat portion contains both of brookite-type $TiO_2$ considered to have the effect of facilitating insertion and release of an Li ion and rutile-type $TiO_2$ having high dielectric effect, and output characteristics of the non-aqueous electrolyte secondary battery are thereby improved. In addition, by containing rutile-type $TiO_2$ considered to have high mechanical strength, it is possible to suitably prevent a fracture in the positive electrode active material and peeling of the coat portion during a charge-discharge cycle. With this, it can be considered that cycle characteristics of the non-aqueous electrolyte secondary battery are improved after the charge-discharge cycle.

In a preferred aspect of the positive electrode active material disclosed herein, a presence ratio (A/B) between an amount of presence (A) of Ti serving as the brookite-type $TiO_2$ in the coat portion and an amount of presence (B) of Ti serving as the rutile-type $TiO_2$ in the coat portion which is calculated based on Ti peak analysis by XAFS is 0.15 to 2.0.

According to the positive electrode active material having the above composition, it is possible to give more excellent output characteristics to the non-aqueous electrolyte secondary battery and reduce an increase in resistance after cyclic charge and discharge more suitably.

In a preferred aspect of the positive electrode active material disclosed herein, when an amount of a metallic element except an alkali metal element contained in the core portion which is calculated based on ICP analysis on a molar basis is assumed to be 100 parts, an amount of Ti serving as the brookite-type $TiO_2$ and the rutile-type $TiO_2$ in the coat portion is 0.5 to 5.0 parts.

According to the positive electrode active material having the above composition, it is possible to give more excellent output characteristics to the non-aqueous electrolyte secondary battery and reduce the increase in resistance after the cyclic charge and discharge more suitably.

In addition, as another aspect, the present disclosure provides a non-aqueous electrolyte secondary battery including a positive electrode containing any positive electrode active material disclosed herein, a negative electrode, and a non-aqueous electrolyte. The non-aqueous electrolyte secondary battery having the above structure has excellent output characteristics, and hence the non-aqueous electrolyte secondary battery can be used preferably.

DETAILED DESCRIPTION

Hereinbelow, a preferred embodiment related to a positive electrode active material disclosed herein and a non-aqueous electrolyte secondary battery using the positive electrode active material will be described in detail with reference to the drawings appropriately. Note that, apart from matters which are specifically mentioned in the present specification, other matters which are necessary for implementation can be understood as design matters of those skilled in the art based on the conventional art in the field. The present disclosure can be implemented based on contents disclosed in the present specification and common general technical knowledge in the field. Note that the following embodiment is not intended to limit the technique disclosed herein. In addition, in the drawings shown in the present specification, members and portions which have the same functions are designated by the same reference numerals, and the description thereof is made. Further, dimensional relationships (length, width, thickness, and the like) in the individual drawings do not necessarily reflect actual dimensional relationships.

Note that, in the present specification and the scope of claims, in the case where a predetermined numerical range is described as "A to B" (each of A and B is any numerical value), the predetermined numerical range means A or more and B or less. Accordingly, the predetermined numerical range includes the case of a numerical range of more than A and less than B.

In the present specification, a "non-aqueous electrolyte secondary battery" denotes an ordinary battery which uses a non-aqueous electrolyte solution as an electrolyte and can be charged and discharged repeatedly. A typical example of such a non-aqueous electrolyte secondary battery includes a lithium-ion secondary battery. The lithium-ion secondary battery is a secondary battery which uses a lithium (Li) ion as an electrolyte ion (charge carrier) and performs charge and discharge by movement of the lithium ion between a positive electrode and a negative electrode. In addition, in the present specification, an "active material" denotes a material which reversibly occludes and releases a charge carrier.

First, a description will be given of a lithium-ion secondary battery which uses a positive electrode active material 1 according to the present embodiment. Note that, in the following description, a description is given of a square lithium-ion secondary battery 100 which includes a flat wound electrode body 20, but it is not intended to limit the non-aqueous electrolyte secondary battery disclosed herein to such a configuration. The non-aqueous electrolyte secondary battery disclosed herein can also be configured as a lithium-ion secondary battery which includes a laminated electrode body (i.e., an electrode body in which a plurality of positive electrodes and a plurality of negative electrodes are alternately stacked). In addition, the non-aqueous electrolyte secondary battery disclosed herein can also be configured as a coin-type lithium-ion secondary battery, a button-type lithium-ion secondary battery, a cylindrical lithium-ion secondary battery, or a laminate-type lithium-ion secondary battery. Further, the non-aqueous electrolyte secondary battery disclosed herein can also be configured as a non-aqueous electrolyte secondary battery other than the lithium-ion secondary battery according to a known method.

Figure 1:
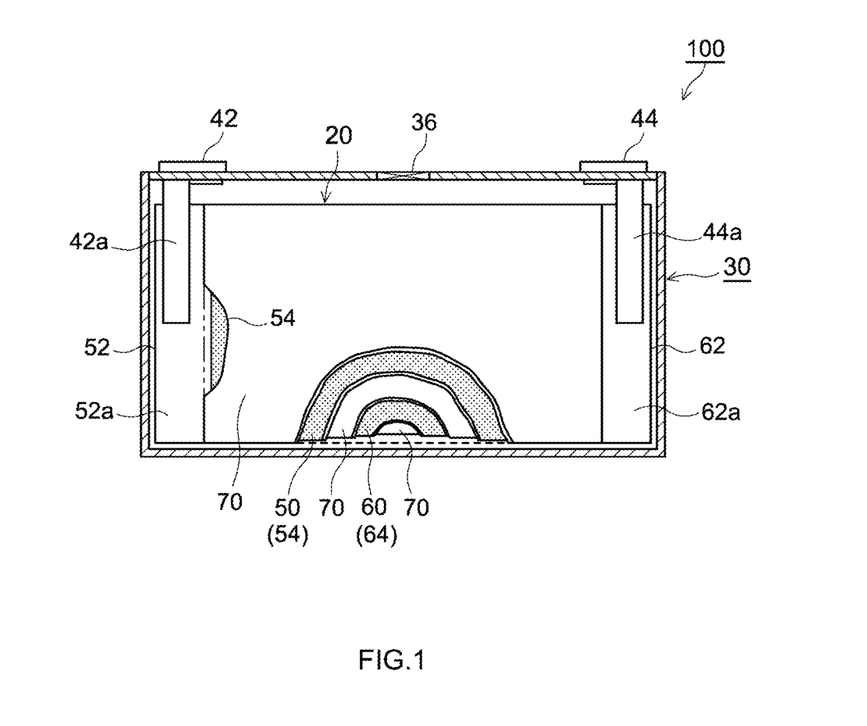
FIG. 1 is a cross-sectional view schematically showing an internal structure of a lithium-ion secondary battery according to an embodiment.

FIG. 1 is a cross-sectional view schematically showing an internal structure of the lithium-ion secondary battery according to the embodiment. The lithium-ion secondary battery 100 according to the present embodiment is a sealed battery constructed by accommodating the flat wound electrode body 20 and a non-aqueous electrolyte (not shown) in a flat square battery case (i.e., an outer case) 30. The battery case 30 is provided with a positive electrode terminal 42 and a negative electrode terminal 44 for external connection, and a thin safety valve 36 which is set such that, in the case where the internal pressure of the battery case 30 rises to a predetermined level or higher, the internal pressure is released. The positive and negative electrode terminals 42 and 44 are electrically connected to positive and negative electrode current collector plates 42a and 44a, respectively. As the material of the battery case 30, a light metal material having excellent thermal conductivity such as aluminum is used.

Figure 2:
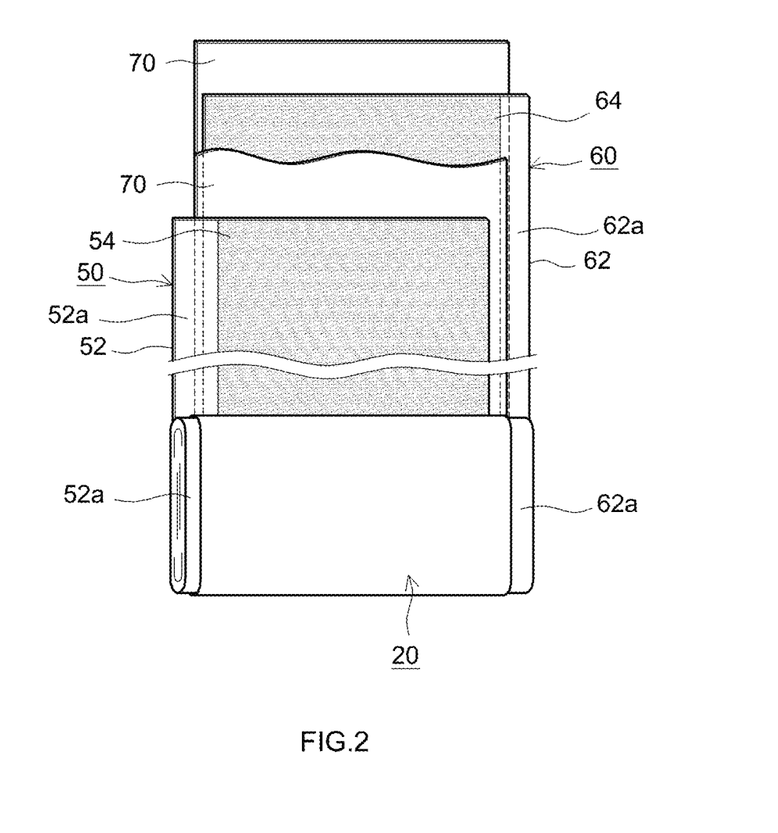
FIG. 2 is a view schematically showing a configuration of a wound electrode body provided in the lithium-ion secondary battery according to the embodiment.

As shown in FIGS. 1 and 2, the wound electrode body 20 has a form in which a positive electrode sheet 50 and a negative electrode sheet 60 are stacked via two long separator sheets 70 and are wound in a longitudinal direction. The positive electrode sheet 50 has a configuration in which a positive electrode active material layer 54 is formed along the longitudinal direction on one surface or both surfaces (herein, both surfaces) of a long positive electrode current collector 52. The negative electrode sheet 60 has a configuration in which a negative electrode active material layer 64 is formed along the longitudinal direction on one surface or both surfaces (herein, both surfaces) of a long negative electrode current collector 62. A positive electrode active material layer non-formation portion 52a (i.e., a portion in which the positive electrode active material layer 54 is not formed and the positive electrode current collector 52 is exposed) and a negative electrode active material layer non-formation portion 62a (i.e., a portion in which the negative electrode active material layer 64 is not formed and the negative electrode current collector 62 is exposed) are formed so as to protrude outward from both ends of the wound electrode body 20 in a winding axis direction (i.e., a sheet width direction orthogonal to the above longitudinal direction). To the positive electrode active material layer non-formation portion 52a and the negative electrode active material layer non-formation portion 62a, the positive electrode current collector plate 42a and the negative electrode current collector plate 44a are joined, respectively.

As the positive electrode current collector 52, it is possible to use a conventionally known positive electrode current collector used in the lithium-ion secondary battery, and an example thereof includes a sheet or foil made of metal having excellent conductivity (e.g., aluminum, nickel, titanium, or stainless steel). As the positive electrode current collector 52, aluminum foil is preferable. The dimensions of the positive electrode current collector 52 are not particularly limited, and may be appropriately determined according to battery design. In the case where the aluminum foil is used as the positive electrode current collector 52, the thickness of the aluminum foil is not particularly limited, and is, e.g., 5 µm or more and 35 µm or less, and preferably 7 µm or more and not 20 µm or less.

The positive electrode active material layer 54 contains the positive electrode active material 1 disclosed herein (the positive electrode active material 1 will be described later).

The positive electrode active material layer 54 may contain ingredients other than the positive electrode active material 1 such as, e.g., trilithium phosphate, a conductive material, and a binder. As the conductive material, it is possible to suitably use carbon black such as, e.g., acetylene black (AB) and other carbon materials (e.g., graphite). As the binder, it is possible to use, e.g., polyvinylidene fluoride (PVDF) and the like.

The content of the positive electrode active material in the positive electrode active material layer 54 (i.e., the content of the positive electrode active material with respect to the total mass of the positive electrode active material layer 54) is not particularly limited, and is preferably 70% by mass or more, more preferably 80% by mass or more and 97% by mass or less, and further preferably 85% by mass or more and 96% by mass or less. The content of trilithium phosphate in the positive electrode active material layer 54 is not particularly limited, and is preferably 1% by mass or more and 15% by mass or less, and more preferably 2% by mass or more and 12% by mass or less. The content of the conductive material in the positive electrode active material layer 54 is not particularly limited, and is preferably 1% by mass or more and 15% by mass or less, and more preferably 3% by mass or more and 13% by mass or less. The content of the binder in the positive electrode active material layer 54 is not particularly limited, and is preferably 1% by mass or more and 15% by mass or less, and more preferably 1.5% by mass or more and 10% by mass or less.

The thickness of the positive electrode active material layer 54 is not particularly limited, and is, e.g., 10 μm or more and 300 μm or less, and preferably 20 μm or more and 200 μm or less.

As the negative electrode current collector 62, a known negative electrode current collector used in the lithium-ion secondary battery may be used, and an example thereof includes a sheet or foil made of metal having excellent conductivity (e.g., copper, nickel, titanium, or stainless steel). As the negative electrode current collector 62, copper foil is preferable. The dimensions of the negative electrode current collector 62 are not particularly limited, and may be appropriately determined according to battery design. In the case where the copper foil is used as the negative electrode current collector 62, the thickness of the copper foil is not particularly limited, and is, e.g., 5 μm or more and 35 μm or less, and preferably 7 μm or more and 20 μm or less.

The negative electrode active material layer 64 contains a negative electrode active material. As the negative electrode active material, it is possible to use carbon materials such as, e.g., graphite, hard carbon, and soft carbon. Graphite may be natural graphite or artificial graphite, and may also be amorphous carbon-coated graphite obtained by coating graphite with an amorphous carbon material.

The average particle diameter (median diameter: D50) of the negative electrode active material is not particularly limited, and is, e.g., 0.1 μm or more and 50 μm or less, preferably 1 μm or more and 25 μm or less, and more preferably 5 μm or more and 20 μm or less.

Note that the "average particle diameter" in the present specification means, e.g., the particle diameter corresponding to cumulative 50% from the smaller particle diameter side in volume-based particle size distribution based on a laser diffraction-scattering method.

The negative electrode active material layer 64 can contain ingredients other than the active material such as, e.g., a binder and a thickening agent. As the binder, it is possible to use, e.g., styrene butadiene rubber (SBR) and polyvinylidene fluoride (PVDF). As the thickening agent, it is possible to use, e.g., carboxymethylcellulose (CMC) and the like.

The content of the negative electrode active material in the negative electrode active material layer is preferably 90% by mass or more, and is more preferably 95% by mass or more and 99% by mass or less. The content of the binder in the negative electrode active material layer is preferably 0.1% by mass or more and 8% by mass or less, and more preferably 0.5% by mass or more and 3% by mass or less. The content of the thickening agent in the negative electrode active material layer is preferably 0.3% by mass or more and 3% by mass or less, and more preferably 0.5% by mass or more and 2% by mass or less.

The thickness of the negative electrode active material layer 64 is not particularly limited, and is, e.g., 10 μm or more and 300 μm or less, and preferably 20 μm or more and 200 μm or less.

An example of the separator sheet 70 includes a porous sheet (film) made of a resin such as polyethylene (PE), polypropylene (PP), polyester, cellulose, or polyamide. Such a porous sheet may have a single-layer structure, and may also have a multilayer structure having two or more layers (e.g., a three-layer structure in which PP layers are stacked on both surfaces of a PE layer). A heat-resistant layer (HRL) may be provided on the surface of the separator sheet 70.

The non-aqueous electrolyte typically contains a non-aqueous solvent and a supporting electrolyte (electrolyte salt). As the non-aqueous solvent, it is possible to use organic solvents of various carbonates, ethers, esters, nitriles, sulfones, and lactones which are used in an electrolyte solution of a typical lithium-ion secondary battery without particular limitation. Specific examples thereof include ethylene carbonate (EC), propylene carbonate (PC), diethyl carbonate (DEC), dimethyl carbonate (DMC), ethyl methyl carbonate (EMC), monofluoroethylene carbonate (MFEC), difluoroethylene carbonate (DFEC), monofluoromethyl difluooromethyl carbonate (F-DMC), and trifluorodimethyl carbonate (TFDMC). Such a non-aqueous solvent can be used alone or by appropriately combining two or more types of non-aqueous solvents.

As the supporting electrolyte, it is possible to suitably use lithium salt (preferably $LiPF_6$) such as, e.g., $LiPF_6$, $LiBF_4$, or a lithium bis (fluorosulfonyl) imide (LiFSI). The concentration of the supporting electrolyte is preferably 0.7 mol/L or more and 1.3 mol/L or less.

Note that the above non-aqueous electrolyte may contain ingredients other than the above-described ingredients, e.g., various additives including a film-forming agent such as an oxalate complex; a gas generating agent such as biphenyl (BP) or cyclohexylbenzene (CHB); and a thickening agent as long as the effect of the present disclosure is not significantly impaired.

The lithium-ion secondary battery 100 can be produced by a method similar to a known method except that the positive electrode active material 1 described below is used.

Figure 3:
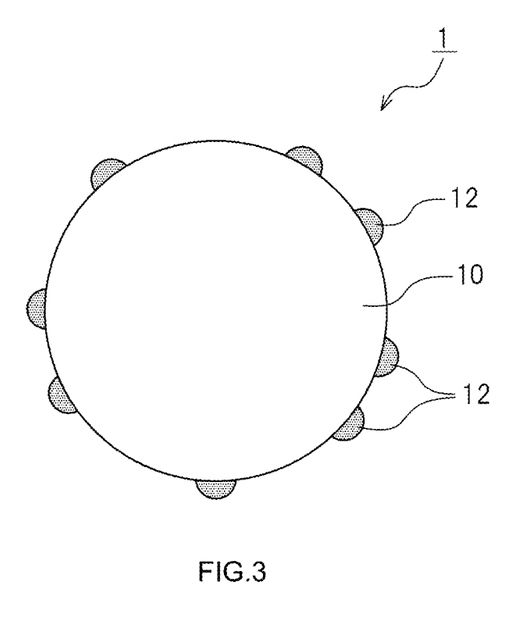
FIG. 3 is a view schematically showing a configuration of a positive electrode active material according to the embodiment.

Next, the positive electrode active material 1 will be described. FIG. 3 is a view schematically showing the configuration of the positive electrode active material 1 according to the embodiment. Roughly speaking, the positive electrode active material 1 according to the present embodiment includes a core portion 10 and a coat portion 12 with which at least part of the surface of the core portion is coated. In addition, the coat portion 12 contains brookite-type $TiO_2$ and rutile-type $TiO_2$. Hereinbelow, each component will be described.

(a) Core Portion 10

The core portion 10 is a particle containing a lithium transition metal composite oxide. The crystal structure of the lithium transition metal composite oxide is not particularly limited, and may be a layer structure, a spinel structure, or an olivine structure. As the lithium transition metal composite oxide, the lithium transition metal composite oxide containing at least one of Ni, Co, and Mn as a transition metal element is preferable, and specific examples of the lithium transition metal composite oxide include a lithium-nickel composite oxide, a lithium-cobalt composite oxide, a lithium-manganese composite oxide, a lithium-nickel-manganese composite oxide, a lithium-nickel-cobalt-manganese composite oxide, a lithium-nickel-cobalt-aluminum composite oxide, and a lithium-iron-nickel-manganese composite oxide.

Note that, in the present specification, the "lithium-nickel-cobalt-manganese composite oxide" is a term which includes oxides containing Li, Ni, Co, Mn, and O as constituent elements, and also includes oxides containing one or two or more additive elements other than the constituent elements mentioned above. Examples of such an additive element include transition metal elements and typical metal elements such as Mg, Ca, Al, V, Cr, Y, Zr, Nb, Mo, Hf, Ta, W, Na, Fe, Zn, and Sn. In addition, the additive elements may also be metalloid elements such as B, C, Si, and P, and non-metallic elements such as S, F, Cl, Br, and I. This also applies to the case where the lithium-nickel composite oxide, the lithium-cobalt composite oxide, the lithium-manganese composite oxide, the lithium-nickel-manganese composite oxide, the lithium-nickel-cobalt-manganese composite oxide, the lithium-nickel-cobalt-aluminum composite oxide, or the lithium-iron-nickel-manganese composite oxide described above is used as the core portion 10.

As the lithium-nickel-cobalt-manganese composite oxide, the lithium-nickel-cobalt-manganese composite oxide having a composition represented by the following Formula (I) is preferable.

$$Li_{1+x}Ni_yCo_zMn(1-y-z)M_\alpha O_{2-\beta}Q_\beta \quad (I)$$

In Formula (I), x, y, z, α, and β satisfy $0 \leq x \leq 0.7$, $0.1 < y < 0.9$, $0.1 < z < 0.4$, $0 \leq \alpha \leq 0.1$, and $0 \leq \beta \leq 0.5$, respectively. M is at least one element selected from the group consisting of Zr, Mo, W, Mg, Ca, Na, Fe, Cr, Zn, Sn, and Al. Q is at least one element selected from the group consisting of F, Cl, and Br. From the viewpoints of energy density and thermal stability, y and z preferably satisfy $0.3 \leq y \leq 0.5$ and $0.2 \leq z \leq 0.4$, respectively. x preferably satisfies $0 \leq x \leq 0.25$, more preferably satisfies $0 \leq x \leq 1.5$, and further preferably satisfies $x=0$. α preferably satisfies $0 \leq \alpha \leq 0.05$, and more preferably satisfies $\alpha=0$. β preferably satisfies $0 \leq \beta \leq 0.1$, and more preferably satisfies $\beta=0$.

The shape of the core portion 10 is not particularly limited as long as the effect of the technique disclosed herein is exerted, and may be, e.g., a spherical, plate-like, bowl-like, or indefinite shape. In addition, the core portion 10 may be in the form of a secondary particle obtained by aggregating primary particles, and may also have a hollow form. The average particle diameter of the core portion 10 is, e.g., 0.05 μm or more and 20 μm or less, preferably 1 μm or more and 20 μm or less, and more preferably 3 μm or more and 15 μm or less.

An example of a manufacturing method of the core portion 10 includes a method in which a precursor of a lithium transition metal composite oxide (e.g., a metal hydroxide) is produced by a crystallization method or the like, and lithium is introduced into the precursor (see Examples described later).

(b) Coat Portion 12

The coat portion 12 is formed on at least part of the surface of the core portion 10. The coat portion 12 contains brookite-type $TiO_2$ and rutile-type $TiO_2$.

In general, as the crystal structure of $TiO_2$ (titanium dioxide), the anatase type (tetragon), the rutile type (tetragon), and the brookite type (orthorhombic crystal) are known. The brookite-type crystal structure is extremely unstable as compared with the anatase-type crystal structure and the rutile-type crystal structure, and hence the brookite-type crystal structure easily forms a complex with, e.g., an Li ion. Consequently, according to the coat portion 12 containing brookite-type $TiO_2$, the speed of insertion and release of the Li ion into and from the positive electrode active material is increased. As a result, the reaction resistance (charge transfer resistance) of the positive electrode active material can be reduced, and hence it can be considered that it is possible to improve output characteristics of the non-aqueous electrolyte secondary battery. In addition, rutile-type $TiO_2$ is considered to have high dielectric effect, and be excellent in mechanical strength. Accordingly, the coat portion 12 contains rutile-type $TiO_2$, whereby it is possible to suitably prevent a fracture in the positive electrode active material and peeling of the coat portion during a charge-discharge cycle. With this, it can be considered that cycle characteristics of the non-aqueous electrolyte secondary battery are improved after the above charge-discharge cycle.

Note that it is possible to determine that the coat portion 12 contains brookite-type $TiO_2$ and rutile-type $TiO_2$ by a conventionally known method. For example, it is possible to determine that the coat portion 12 contains brookite-type $TiO_2$ and rutile-type $TiO_2$ by performing x-ray absorption fine structure (XAFS) analysis on the coat portion 12 to analyze a Ti peak.

A presence ratio (A/B) of Ti between an amount of presence (A) of Ti serving as brookite-type $TiO_2$ in the coat portion 12 and an amount of presence (B) of Ti serving as rutile-type $TiO_2$ in the coat portion 12 is not particularly limited as long as the effect of the technique disclosed herein is exerted. The presence ratio (A/B) of Ti can be in a range of about 0.01 to 10. In addition, from the viewpoint of improving output characteristics and cycle characteristics, the presence ratio (A/B) of Ti can be preferably in a range of 0.15 to 2.8, more preferably in a range of 0.15 to 2.0, and further preferably in a range of 0.18 to 2.0.

Note that the presence ratio (A/B) of Ti between the amount of presence (A) of Ti serving as brookite-type $TiO_2$ and the amount of presence (B) of Ti serving as rutile-type $TiO_2$ can be determined by, e.g., Ti peak analysis by XAFS. While a specific measurement device and specific measurement conditions are described in Examples described later, Ti peaks of standard samples of brookite-type $TiO_2$ and rutile-type $TiO_2$ are determined by the XAFS analysis. Next, the Ti peak in the coat portion 12 is determined by the XAFS analysis. Subsequently, the Ti peak of the positive electrode active material 1 is quantified by performing fitting of the Ti peak of the positive electrode active material 1 using XAFS analysis software (Athena, Artemis, or the like) based on a peak of a standard sample. With this, it is possible to determine the presence ratio (A/B) of Ti.

In addition, when the amount of a metallic element except an alkali metal element contained in the core portion 10 is assumed to be 100 parts on a molar basis, the amount of Ti serving as brookite-type $TiO_2$ and rutile-type $TiO_2$ in the coat portion 12 is not particularly limited as long as the effect of the technique disclosed herein is exerted. Such an amount of Ti can be in a range of about 0.01 to 10 parts. In addition, from the viewpoint of improving output characteristics and cycle characteristics, the amount of Ti can be preferably in a range of 0.05 to 5.0 parts, more preferably in a range of 0.5 to 5.0 parts, and further preferably in a range of 0.5 to 4.0 parts.

Note that the amount of the metallic element except the alkali metal contained in the core portion and the amount of Ti contained in the coat portion can be determined by ICP analysis. A specific measurement device and specific measurement conditions are described in Examples described later.

The shape of each of brookite-type $TiO_2$ and rutile-type $TiO_2$ is not particularly limited as long as the effect of the technique disclosed herein is exerted, and may be, e.g., a spherical, plate-like, bowl-like, or indefinite shape. The average particle diameter of $TiO_2$ is not particularly limited as long as the effect of the technique disclosed herein is exerted, and can be about 0.1 to 200 nm (e.g., about 100 nm).

The thickness of the coat portion 12 is not particularly limited as long as the effect of the technique disclosed herein is exerted, and can be in a range of about 0.1 nm to 500 nm (e.g., 1 nm to 200 nm or 10 nm to 100 nm). The thickness of the coat portion 12 can be determined by, e.g., observing the cross section of the positive electrode active material 1 with energy dispersive X-ray spectroscopy analysis (TEM-EDX) using a transmission electron microscope.

Note that the coat portion 12 may contain other ingredients within the scope which does not significantly impair the effect of the present disclosure. An example of other ingredients includes anatase-type $TiO_2$.

The positive electrode active material 1 according to the present embodiment can be manufactured by, e.g., the following manufacturing method. First, the core portion 10, brookite-type $TiO_2$, and rutile-type $TiO_2$ are charged into a mechanochemical device, and coating processing is performed. Brookite-type $TiO_2$ has an extremely unstable crystal structure, and hence it has been difficult to use it as a coating object. However, as a result of elaborate study of the present inventors, it has been found that it is possible to form the coat portion 12 containing brookite-type $TiO_2$ on the surface of the core portion 10 by mechanochemical processing.

Note that, although not limited thereto, as a method of manufacturing the positive electrode active material 1 such that, when the amount of the metallic element except the alkaline metal element contained in the core portion 10 is assumed to be 100 parts on a molar basis, the amount of Ti contained in the coat portion 12 is X parts (X>0), there is a method in which the core portion and $TiO_2$ ($TiO_2$ including brookite-type $TiO_2$ and rutile-type $TiO_2$) are prepared such that a molar ratio of about 100:X+1 is satisfied, the core portion and $TiO_2$ are charged into the mechanochemical device, and the mechanochemical processing is performed (e.g., for 30 minutes at 6000 rpm). In addition, in the case where the presence ratio (A/B) of Ti is made equal to Y/Z (Y>0, Z>0), it is only necessary to make a mass ratio between brookite-type $TiO_2$ and rutile-type $TiO_2$ equal to about Y:Z.

The lithium-ion secondary battery 100 which uses the thus configured positive electrode active material 1 can be used for various purposes. For example, the lithium-ion secondary battery 100 can be suitably used as a high output power source (drive power source) for a motor mounted on a vehicle. The type of the vehicle is not particularly limited, and examples of the vehicle typically include a plug-in hybrid electric vehicle (PHEV), a hybrid electric vehicle (HEV), and a battery electric vehicle (BEV). The lithium-ion secondary battery 100 can also be used in the form of a battery pack in which a plurality of the lithium-ion secondary batteries 100 are electrically connected to each other.

Hereinbelow, while Examples related to the present disclosure will be described, it is not intended to limit the present disclosure to such Examples.

Production of Positive Electrode Active Material
Production of Core Portion

An aqueous solution in which sulfate of metal other than Li was dissolved in water was prepared. For example, in the case where an $LiNi_{1/3}Co_{1/3}Mn_{1/3}O_2$ particle having a layer structure was produced as the core portion, an aqueous solution containing nickel sulfate, cobalt sulfate, and manganese sulfate such that a molar ratio of Ni, Co, and Mn was 1:1:1 was prepared in a reaction vessel. By adding NaOH and aqueous ammonia to the aqueous solution in the reaction vessel to neutralize the aqueous solution, a composite hydroxide containing metal other than Li serving as a precursor of the core portion was crystallized. The obtained composite hydroxide and lithium carbonate were mixed at a predetermined ratio. For example, in the case where an $LiNi_{1/3}Co_{1/3}Ni_{1/3}O_2$ particle having a layer structure was produced as the core portion, the composite hydroxide and lithium carbonate were mixed such that a molar ratio of (Ni+Co+Mn):Li was 1:1. This mixture was calcined for 15 hours at a temperature of 870° C. The mixture was cooled to room temperature (25° C.±5° C.), and crushing processing was performed. With this, a spherical core portion (average particle diameter: 5.0 µm) in which primary particles were aggregated was obtained.

Thus, as the core portions, $LiNi_{1/3}Co_{1/3}Mn_{1/3}O_2$, $LiCoO_2$, $LiMn_2O_4$, $LiNiO_2$, $LiNi_{0.5}Mn_{1.5}O_4$, and $LiNi_{0.8}Co_{0.15}Al_{0.05}O_2$ were produced.

Positive Electrode Active Material according to Sample 1

The core portion ($LiNi_{1/3}Co_{1/3}Mn_{1/3}O_2$) produced in the manner described above was used as the positive electrode active material according to Sample 1.

Positive Electrode Active Material According to Sample 2

The core portion ($LiNi_{1/3}Co_{1/3}Mn_{1/3}O_2$) produced in the manner described above and brookite-type $TiO_2$ (average particle diameter: about 100 nm, the same applies to the following description) were charged into the mechanochemical device, and the mechanochemical processing was performed for 30 minutes at 6000 rpm. At this point, the core portion and the brookite-type $TiO_2$ were charged such that a mass ratio of 100:1 was satisfied. With this, the positive electrode active material according to Sample 2 in which the coat portion containing brookite-type $TiO_2$ was formed on the surface of the core portion was produced.

Positive Electrode Active Material According to Sample 3

The positive electrode active material according to Sample 3 was produced in the same manner as in Sample 2 except that rutile-type $TiO_2$ (average particle diameter: about 100 nm, the same applies to the following description) was used as $TiO_2$.

Positive Electrode Active Material According to Sample 4

The positive electrode active material according to Sample 4 was produced in the same manner as in Sample 2 except that anatase-type $TiO_2$ (average particle diameter: about 100 nm) was used as $TiO_2$.

Positive Electrode Active Materials According to Samples 5 to 14

The core portion ($LiNi_{1/3}Co_{1/3}Mn_{1/3}O_2$) produced in the manner described above, brookite-type $TiO_2$, and rutile-type $TiO_2$ were charged into the mechanochemical device, and the mechanochemical processing was performed for 30 minutes at 6000 rpm. Herein, for example, in the case where the positive electrode active material according to Sample 8 was produced, the above core portion, the above brookite-type $TiO_2$, and the above rutile-type $TiO_2$ were charged such that a mass ratio of 300:2:1 was satisfied. With this, the positive electrode active material according to each of Samples 5 to 14 in which the coat portion containing brookite-type $TiO_2$ and rutile-type $TiO_2$ was formed on the surface of the core portion was produced.

Observation of Positive Electrode Active Material
XAFS Analysis

The presence ratio (A/B) between the amount of presence (A) of Ti serving as brookite-type $TiO_2$ and the amount of presence (B) of Ti serving as rutile-type $TiO_2$ was determined by the XAFS analysis. Hereinbelow, the XAFS analysis will be described.

A standard sample of brookite-type $TiO_2$ and boron nitride were mixed by using a dancing mill at a molar ratio of 1:99. In addition, a standard sample of rutile-type $TiO_2$ and boron nitride were mixed by using the dancing mill at a molar ratio of 1:99. Each of the mixtures was pressed at a pressing pressure of 30 kN, and a standard sample was thereby produced. Next, each of the positive electrode active materials according to Samples 5 to 14 was pressed at a pressing pressure of 30 kN, and a specimen for analysis was thereby produced.

Subsequently, by using the Ti peak of brookite-type $TiO_2$ and the Ti peak of rutile-type $TiO_2$ obtained by the XAFS analysis of the standard sample, fitting of the Ti peak of each Sample (in the vicinity of 5000 eV) was performed with analysis software Athena, and the Ti peak thereof was quantified. With this, the amount of presence (A) of Ti serving as brookite-type $TiO_2$ and the amount of presence (B) of Ti serving as rutile-type $TiO_2$ were determined, and the presence ratio (A/B) was calculated (hereinafter also simply referred to as "presence ratio (A/B) of Ti"). The result was shown in a section of "Presence Ratio (A/B) of Ti" in Table 1.

Conditions of XAFS Analysis
- analysis device: Aichi Synchrotron Radiation Center BL5S1
- measurement method: transmission method (standard sample) and fluorescence method
- monochromator: double-crystal monochromator
- analyzing crystal: Si (111)
- measurement absorption edge: Ti-K absorption edge
- measurement energy range: 4800 eV to 6000 eV
- analysis software: Athena (Demeter ver. 0.9.26)

ICP Analysis

The amount of the metallic element except the alkali metal contained in the core portion and the amount of Ti contained in the coat portion were calculated on a molar basis by quantitative analysis which used an ICP emission analyzer (manufactured by Japan Dionex Co., Ltd., Ion Chromatograph ISC-5000). With this, the amount of Ti contained in the coat portion when the amount of the metallic element except the alkali metal contained in the core portion was assumed to be 100 parts by was calculated. The result was shown in a section of "Amount of Ti" in Table 1.

Production of Lithium-Ion Secondary Battery for Evaluation

The positive electrode active material of each of Samples 1 to 14 produced in the manner described above, acetylene black (AB) serving as a conductive material, polyvinylidene fluoride (PVDF) serving as a binder, and N-methylpyrrolidone (NMP) serving as a dispersion medium were mixed by using a planetary mixer, and paste for forming a positive electrode active material layer was prepared. At this point, a mass ratio of the active material, AB, and PVDF was 90:8:2, and a solid content concentration was 56%. The paste was applied to both surfaces of aluminum foil by using a die coater and was pressed after being dried, and a positive electrode sheet was thereby produced.

In addition, natural graphite (C) serving as a negative electrode active material, styrene butadiene rubber (SBR) serving as a binder, and carboxymethylcellulose (CMC) serving as a thickening agent were mixed in ion-exchanged water at a mass ratio of C:SBR:CMC=98:1:1, and paste for forming a negative electrode active material layer was prepared. The paste was applied to both surfaces of copper foil by using a die coater and pressed after being dried, and a negative electrode sheet was thereby produced.

As a separator sheet, two porous polyolefin sheets each having a PP/PE/PP three-layer structure and a thickness of 24 μm were prepared.

The produced positive electrode sheet, the produced negative electrode sheet, and the prepared two separator sheets were stacked on each other and wound, and a wound electrode body was thereby produced. An electrode terminal was mounted to each of the positive electrode sheet and the negative electrode sheet of the produced wound electrode body by welding, and the wound electrode body was accommodated in a battery case having a liquid inlet. A non-aqueous electrolyte solution was injected from the liquid inlet, and the liquid inlet was sealed hermetically with a sealing lid. Note that, as the non-aqueous electrolyte solution, the non-aqueous electrolyte solution obtained by dissolving, at a concentration of 1.0 mol/L, $LiPF_6$ serving as a supporting electrolyte in a mixed solvent containing ethylene carbonate (EC), dimethyl carbonate (DMC), and ethyl methyl carbonate (EMC) at a volume ratio of 1:1:1 was used. Thus, the lithium-ion secondary battery for evaluation was obtained.

Activation Processing

Under an environment of 25° C., activation processing (initial charge) of each lithium-ion secondary battery for evaluation was performed. In the activation processing, a constant current-constant voltage method was used, and the lithium-ion secondary battery was fully charged by performing constant current charge with a current value of ⅓ C until 4.2 V was reached and then performing constant voltage charge until the current value reached 1/50 C. Thereafter, constant current discharge was performed until voltage reached 3.0 V with a current value of ⅓ C.

Evaluation of Output Characteristics

After adjusting an open-circuit voltage of each lithium-ion secondary battery for evaluation having been subjected to the activation processing to 3.7 V, the lithium-ion secondary battery was placed under a temperature environment of 25° C. Discharge was performed for 10 seconds with a current value of 50 C, and a voltage drop amount (ΔV) at this point was determined. Subsequently, battery resistance was calculated by diving the voltage drop amount ΔV by a discharge current value (50 C), and the battery resistance was used as initial resistance. Note that, in "Initial Resistance Ratio" in Table 1, the initial resistance of the lithium-ion secondary battery according to each of Samples 2 to 14 in the case where an initial resistance value of the lithium-ion secondary battery according to Sample 1 was assumed to be 1 was described. Output characteristics can be evaluated to be more excellent as the value of the initial resistance ratio is smaller.

Evaluation of Cycle Characteristics

Each lithium-ion secondary battery for evaluation of which the initial resistance ratio was measured in the manner described above was placed under an environment of 60° C., constant current charge was performed with 10 C until 4.3 V was reached, and constant current discharge was then performed with 10 C until 3.1 V was reached. A charge-discharge cycle having the constant current charge and the constant current discharge as one cycle was performed repeatedly 500 times. Subsequently, a value obtained by dividing a battery resistance value after 500 cycles by the initial resistance value was used as a resistance increase rate. Note that, in "Ratio of Resistance Increase Rate (After 500 Cycles)" in Table 1, the resistance increase rate of the lithium-ion secondary battery according to each of Samples 2 to 14 in the case where the resistance increase rate of the lithium-ion secondary battery according to Sample 1 was assumed to be 1 was described. Cycle characteristics can be evaluated to be more excellent as the value of the ratio of the resistance increase rate is smaller.

TABLE 1

| | Type of Core Portion in Positive Electrode Active Material | Amount of Presence (A) of Ti Serving as Brookite-Type $TiO_2$ | Amount of Presence (B) of Ti Serving as Rutile-Type $TiO_2$ | Amount of Presence (C) of Ti Serving as Anatase-Type $TiO_2$ | Presence Ratio (A/B) of Ti | Amount of Ti [Part(s)] | Initial Resistance Ratio (25° C.) | Ratio of Resistance Increase Rate (After 500 Cycles) |
|---|---|---|---|---|---|---|---|---|
| Sample 1 | $LiNi_{1/3}Co_{1/3}Mn_{1/3}O_2$ | 0 | 0 | 0 | — | 0 | 1.00 | 1.00 |
| Sample 2 | | 100 | 0 | 0 | — | 1.0 | 0.90 | 0.95 |
| Sample 3 | | 0 | 100 | 0 | — | 1.0 | 0.97 | 0.87 |
| Sample 4 | | 0 | 0 | 100 | — | 1.0 | 1.01 | 0.99 |
| Sample 5 | | 3 | 97 | 0 | 0.03 | 1.0 | 0.79 | 0.80 |
| Sample 6 | | 15 | 85 | 0 | 0.18 | 1.0 | 0.73 | 0.74 |
| Sample 7 | | 51 | 49 | 0 | 1.0 | 1.0 | 0.70 | 0.75 |
| Sample 8 | | 67 | 33 | 0 | 2.0 | 1.0 | 0.69 | 0.77 |
| Sample 9 | | 74 | 26 | 0 | 2.8 | 1.0 | 0.70 | 0.80 |
| Sample 10 | | 51 | 49 | 0 | 1.0 | 0.05 | 0.82 | 0.83 |
| Sample 11 | | 51 | 49 | 0 | 1.0 | 0.5 | 0.70 | 0.75 |
| Sample 12 | | 51 | 49 | 0 | 1.0 | 2.0 | 0.69 | 0.73 |
| Sample 13 | | 51 | 49 | 0 | 1.0 | 4.0 | 0.72 | 0.70 |
| Sample 14 | | 51 | 49 | 0 | 1.0 | 5.0 | 0.80 | 0.79 |

Examination of Type of Core Portion
Positive Electrode Active Materials according to Samples 15, 17, 19, 21, and 23

The core portions $LiCoO_2$, $LiMn_2O_4$, $LiNiO_2$, $LiNi_{0.5}Mn_{1.5}O_4$, and $LiNi_{0.8}Co_{0.15}Al_{0.05}O_2$ produced in the manner described above were used as the positive electrode active materials according to Samples 15, 17, 19, 21, and 23. Positive Electrode Active Materials According to Samples 16, 18, 20, 22, and 24

Each of the core portions $LiCoO_2$, $LiMn_2O_4$, $LiNiO_2$, $LiNi_{0.5}Mn_{1.5}O_4$, and $LiNi_{0.8}Co_{0.15}Al_{0.05}O_2$ produced in the manner described above was charged into the mechanochemical device together with brookite-type $TiO_2$ and rutile-type $TiO_2$, and the mechanochemical processing was performed for 30 minutes at 6000 rpm. With this, the positive electrode active material according to each of Samples 16, 18, 20, 22, and 24 in which the coat portion containing brookite-type $TiO_2$ and rutile-type $TiO_2$ was formed on the surface of the core portion was produced.

"Presence Ratio (A/B) of Ti" and "Amount of Ti (Part(s))" were calculated in the same manner as that described above for each of the positive electrode active materials according to Samples 15 to 24 produced in the manner described above. The lithium-ion secondary battery for evaluation was produced for each Sample in the same manner as that described above, and the initial resistance and the resistance increase rate (after 500 cycles) were calculated in the same manner as that described above. Subsequently, the initial resistance ratio and the ratio of the resistance increase rate of each of Samples 15, 17, 19, 21, and 23 in the case where each of the initial resistance and the resistance increase rate of the lithium-ion secondary battery for evaluation according to each of Samples 16, 18, 20, 22, and 24 was assumed to be 1 were determined. The results were shown in sections of "Initial Resistance Ratio (25° C.)" and "Ratio of Resistance Increase Rate (After 500 Cycles)" in Table 2.

TABLE 2

| | Composition of Core Portion in Positive Electrode Active Material | Amount of Presence (A) of Ti Serving as Brookite-Type $TiO_2$ | Amount of Presence (B) of Ti Serving as Rutile-Type $TiO_2$ | Amount of Presence (C) of Ti Serving as Anatase-Type $TiO_2$ | Presence Ratio (A/B) of Ti | Amount of Ti [Part(s)] | Initial Resistance Ratio (25° C.) | Ratio of Resistance Increase Rate (After 500 Cycles) |
|---|---|---|---|---|---|---|---|---|
| Sample 1 | $LiNi_{1/3}Co_{1/3}Mn_{1/3}O_2$ | 0 | 0 | 0 | — | 0 | 1.00 | 1.00 |
| Sample 11 | | 51 | 49 | 0 | 1.0 | 0.5 | 0.70 | 0.75 |
| Sample 15 | $LiCoO_2$ | 0 | 0 | 0 | — | 0 | 1.00 | 1.00 |
| Sample 16 | | 50 | 50 | 0 | 1.0 | 0.5 | 0.78 | 0.79 |
| Sample 17 | $LiMn_2O_4$ | 0 | 0 | 0 | — | 0 | 1.00 | 1.00 |
| Sample 18 | | 53 | 47 | 0 | 1.1 | 0.5 | 0.79 | 0.80 |
| Sample 19 | $LiNiO_2$ | 0 | 0 | 0 | — | 0 | 1.00 | 1.00 |
| Sample 20 | | 53 | 47 | 0 | 1.2 | 0.5 | 0.77 | 0.78 |
| Sample 21 | $LiNi_{0.5}Mn_{1.5}O_4$ | 0 | 0 | 0 | — | 0 | 1.00 | 1.00 |
| Sample 22 | | 52 | 48 | 0 | 1.1 | 0.5 | 0.79 | 0.79 |
| Sample 23 | $LiNi_{0.8}Co_{0.15}Al_{0.05}O_2$ | 0 | 0 | 0 | — | 0 | 1.00 | 1.00 |
| Sample 24 | | 53 | 47 | 0 | 1.1 | 0.5 | 0.76 | 0.78 |

From Table 1, it was determined that, in the lithium-ion secondary battery according to each of Samples 5 to 14 which used the positive electrode active material which included the core portion containing the lithium transition metal composite and the coat portion with which at least part of the surface of the core portion was coated, and in which the coat portion contained brookite-type TiO$_2$ and rutile-type TiO$_2$, as compared with the lithium-ion secondary battery according to each of Samples 1 to 4, the initial resistance ratio and the ratio of the resistance increase rate were reduced (i.e., output characteristics and cycle characteristics were excellent).

In addition, when referring to the initial resistance ratio and the ratio of the resistance increase rate of the lithium-ion secondary battery according to each of Samples 5 to 9, it can be seen that both of a reduction in initial resistance ratio and a reduction in the ratio of the resistance increase rate are implemented more appropriately in the case where the presence ratio (A/B) of Ti is 0.15 to 2.0.

When referring to the initial resistance ratio and the ratio of the resistance increase rate in the lithium-ion secondary battery according to each of Samples 10 to 14, it can be seen that both of the reduction in initial resistance ratio and the reduction in the ratio of the resistance increase rate are implemented more appropriately in the case where the amount of Ti is 0.5 to 5.0 parts.

In addition, as shown in Table 2, it was determined that, in the lithium-ion secondary battery according to each of Samples 11, 16, 18, 20, 22, and 24, as compared with the lithium-ion secondary battery according to each of Samples 1, 15, 17, 19, 21, and 23, the initial resistance ratio and the ratio of the resistance increase rate were reduced appropriately (i.e., output characteristics and cycle characteristics were excellent). From this, it can be seen that an initial resistance ratio reduction effect and a resistance increase rate reduction effect are obtained irrespective of the composition and the crystal structure of the core portion of the positive electrode active material.

From the foregoing, it can be seen that, according to the positive electrode active material disclosed herein, it is possible to give excellent output characteristics to the non-aqueous electrolyte secondary battery, and suppress an increase in resistance after cyclic charge and discharge.

While the specific examples of the present disclosure have been described in detail thus far, the specific examples are only illustrative, and are not intended to limit the scope of claims. The technique described in the scope of claims encompasses various modifications and changes to the specific examples described above.

The invention claimed is:

1. A positive electrode active material, comprising:
a core portion which contains a lithium transition metal composite oxide; and
a coat portion with which at least part of a surface of the core portion is coated, wherein:
the coat portion contains brookite-type TiO$_2$ and rutile-type TiO$_2$, and does not contain anatase-type TiO$_2$,
a presence ratio (A/B) between an amount of presence (A) of Ti serving as the brookite-type TiO$_2$ in the coat portion and an amount of presence (B) of Ti serving as the rutile-type TiO$_2$ in the coat portion which is calculated based on Ti peak analysis by XAFS is 0.15 to 2.0,
an amount of a metallic element except an alkali metal element contained in the core portion which is calculated based on ICP analysis on a molar basis is assumed to be 100 parts, and
an amount of Ti serving as the brookite-type TiO$_2$ and the rutile-type TiO$_2$ in the coat portion is 0.5 to 5.0 parts.

2. A non-aqueous electrolyte secondary battery, comprising:
a positive electrode;
a negative electrode; and
a non-aqueous electrolyte, wherein:
the positive electrode contains a positive electrode active material,
the positive electrode active material comprises
a core portion which contains a lithium transition metal composite oxide; and
a coat portion with which at least part of a surface of the core portion is coated,
the coat portion contains brookite-type TiO$_2$ and rutile-type TiO$_2$, and does not contain anatase-type TiO$_2$;
a presence ratio (A/B) between an amount of presence (A) of Ti serving as the brookite-type TiO$_2$ in the coat portion and an amount of presence (B) of Ti serving as the rutile-type TiO$_2$ in the coat portion which is calculated based on Ti peak analysis by XAFS is 0.15 to 2.0;
an amount of a metallic element except an alkali metal element contained in the core portion which is calculated based on ICP analysis on a molar basis is assumed to be 100 parts; and
an amount of Ti serving as the brookite-type TiO$_2$ and the rutile-type TiO$_2$ in the coat portion is 0.5 to 5.0 parts.

* * * * *